United States Patent [19]
Ashida

[11] 4,405,883
[45] Sep. 20, 1983

[54] APPARATUS FOR STOPPING ROTATION OF TAPE REELS

[75] Inventor: Kazutaka Ashida, Yokohama, Japan

[73] Assignee: Victor Company of Japan, Ltd., Yokohama, Japan

[21] Appl. No.: 287,985

[22] Filed: Jul. 29, 1981

[30] Foreign Application Priority Data

Jul. 30, 1980 [JP] Japan .................... 55-108006

[51] Int. Cl.³ ............................ H01J 9/395
[52] U.S. Cl. .......................... 318/6; 318/5; 318/7; 318/54
[58] Field of Search ............... 318/5, 6, 7, 54–57, 318/60, 65, 87; 242/75.44, 75.51

[56] References Cited

U.S. PATENT DOCUMENTS

| | | | |
|---|---|---|---|
| 3,565,366 | 2/1971 | Campbell | 242/75.51 X |
| 3,673,473 | 6/1972 | Werner | 318/7 |
| 4,065,074 | 12/1977 | Anderson et al. | 242/75.51 X |
| 4,129,810 | 12/1978 | Harshberger | 318/6 X |
| 4,218,639 | 8/1980 | Sangun | 318/6 |

Primary Examiner—Ulysses Weldon
Attorney, Agent, or Firm—Louis Bernat

[57] ABSTRACT

An apparatus for rapidly and positively stopping the rotations of first and second tape reels which are driven independently, without introducing slack or damages to a recording medium of a tape form wound by the first and second tape reels. The control system for this apparatus uses digital signals.

3 Claims, 6 Drawing Figures

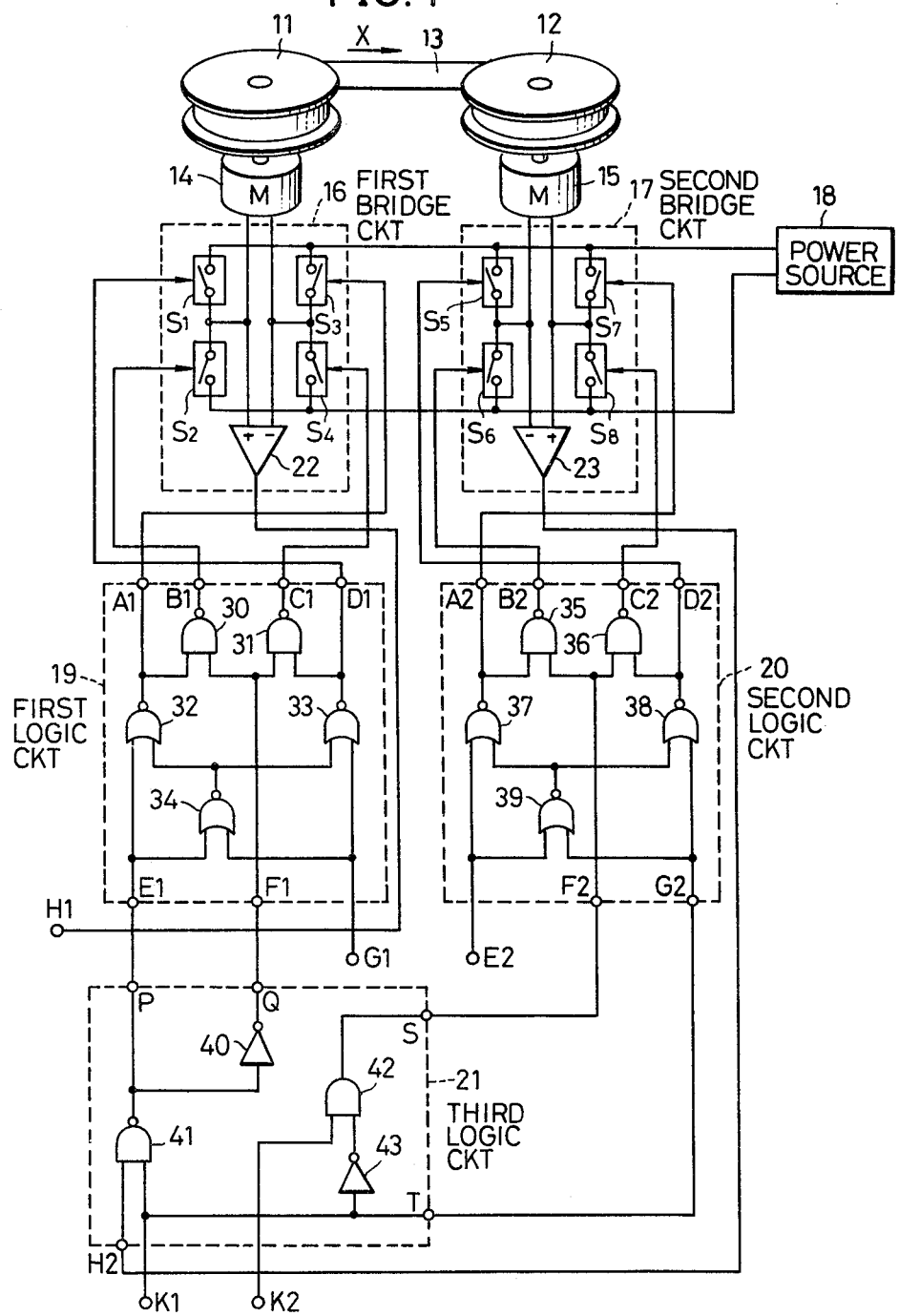

– 4,405,883 –

APPARATUS FOR STOPPING ROTATION OF TAPE REELS

BACKGROUND OF THE INVENTION

The present invention generally relates to apparatuses for stopping rotation of tape reels, and more particularly to an apparatus capable of rapidly and positively stopping the rotations of a first and second tape reels which are driven independently, without introducing slack or damages to a recording medium of a tape form wound by these first and second tape reels, by use of digital signals.

In an apparatus which winds a recording medium of a tape form (hereinafter simply referred to as a tape) from one tape reel which feeds the tape to another tape reel which takes up the tape, as in a magnetic recording and/or reproducing apparatus (tape recorders, VTRs, electronic calculators, and the like), the rotation of the tape reels must be stopped rapidly without introducing slack or damage in the tape, when changing from an operational mode such as a fast-forward or rewind mode to a stop mode. Conventionally, as a general method for stopping the rotation of a motor, there are known methods such as: (1) a mechanical stopping method which uses a mechanical brake and the like, and (2) an electrical method which obtains stopping torque by shortcircuiting the motor terminals, a method which applies reverse torque to the tape reel driving motor by applying a reverse voltage, and the like. However, in the above mechanical stopping method, a braking mechanism which is a separate system, becomes unnecessary, and there was a limit in reducing the size of the reproducing apparatus. Accordingly, when the above braking mechanism is used frequently, degradation is introduced in the reliability of the system due to break down of the system and the like. Moreover, the mechanical noise generated by the solenoid which drives the above brake is large. On the other hand, in the above electrical stopping method, sufficient stopping torque could not be obtained by use of the method which short-circuits the motor terminals. Further, there was a disadvantage in that control was difficult to perform in the method which applies a reverse voltage to the motor.

The method which applies the above reverse voltage to the tape reel driving motor is capable of stopping the rotation of the motor more rapidly than the method which short-circuits the motor terminals. However, in the electrical method which applies the reverse voltage, detection must be performed to detect the stoppage of rotation of the tape reel or the tape reel driving motor, in order to interrupt the application of the reverse voltage. As a method of detecting the stoppage of rotation of the tape reel or the tape reel driving motor, there is a method which detects the stoppage of rotation by an output pulse of a pulse generator by use of a combination of a magnet and a detection head, a photoelectric element, or a contact switch and the like, for example, However, the accuracy in detecting the stoppage of rotation was relatively low. Furthermore, when attempting to increase the accuracy of the detecting operation, the construction of the apparatus becomes complex, and the cost of the apparatus increases.

Therefore, the realization of an apparatus for stopping rotation of tape reels of a simple construction and low cost was highly desired, which is capable of rapidly and positively stopping the rotation of the tape reels without introducing slack or damage in the recording medium of a tape form.

SUMMARY OF THE INVENTION

Accordingly, a general object of the present invention is to provide a novel and useful apparatus for stopping rotation of tape reels, which is capable of rapidly stopping the rotation of tape reels.

Another and more specific object of the present invention is to provide an apparatus for stopping rotation of tape reels, which is capable of rapidly and positively stopping the rotation of tape reels without introducing slack or damage in the recording medium of a tape form wound between tape reels which are driven independently, by use of digital signals.

Still another object of the present invention is to provide an apparatus for stopping rotation of tape reels, which is capable of controlling the rotational speed and the rotational torque of a motor which drives one tape reel, by varying the duty cycle of a train of pulses.

Another object of the present invention is to provide an apparatus for stopping rotation of tape reels, which is capable of stopping the tape reels with high accuracy by use of digital signal processing, without being influenced by noise and the like. According to the apparatus of the present invention, the size and cost of the apparatus can be reduced.

Other objects and further features of the present invention will be apparent from the following detailed description when read in conjunction with the accompanying drawings.

BRIEF DESCRIPTION OF THE DRAWINGS

FIG. 1 is a circuit diagram showing an embodiment of an apparatus for stopping rotation of tape reels according to the present invention.

DETAILED DESCRIPTION

Figure 2A:
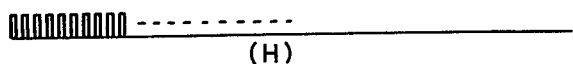
FIGS. 2(A) through 2(E) respectively are time charts for explaining the operation of the apparatus shown in FIG. 1.

FIG. 1 is a circuit diagram showing an embodiment of an apparatus for stopping rotation of tape reels according to the present invention. In FIG. 1, a recording medium 13 of a tape form (hereinafter simply referred to as a tape) in fed out from a supply side tape reel 11 and moves towards a direction indicated by an arrow X, to be taken up by a take-up side tape reel 12. These tape reels 11 and 12 are respectively connected to rotary shafts of tape reel driving DC motors 14 and 15, and are independently driven by these two motors. Motor terminals of the above motors 14 and 15 are respectively connected to a first and second bridge circuits 16 and 17 indicated by broken lines in FIG. 1.

The first bridge circuit 16 comprises switches S1, S2, S3, and S4 and a comparator 22. Input terminals of the switches S1 and S3 are respectively connected to one output terminal of a power source 18, and input terminals of the switches S2 and S4 are respectively connected to the other output terminal of the power source 18. Output terminals of the switches S1 and S2 are respectively connected with each other, and one motor terminal of the motor 14 is connected to one input terminal of the comparator 22 through the connection point between the output terminals of the switches S1 and S2. In addition, output terminals of the switches S3 and S4 are respectively connected with each other, and the other motor terminal of the motor 14 is connected to the other input terminal of the comparator 22 through the connection point between the output terminals of the switches S3 and S4. An output terminal of the comparator 22 is connected to a terminal H1 which will be described hereinafter.

On the other hand, the second bridge circuit 17 is constructed in a manner similar to the above first bridge circuit 16. The second bridge circuit 17 comprises switches S5, S6, S7, and S8 and a comparator 23. Input terminals of the switches S5 and S7 are respectively connected to one output terminal of the power source 18, and input terminals of the switches S6 and S8 are respectively connected to the other output terminal of the power source 18. Output terminals of the switches S5 and S6 are respectively connected with each other, and one motor terminal of the motor 15 is connected to one input terminal of the comparator 23 through the above connection point between the output terminals of the switchs S5 and S6. Further, output terminals of the switches S7 and S8 are respectively connected with each other, and the other motor terminal of the motor 15 is connected to the other input terminal of the comparator 23 through the above connection points between the output terminals of the switches S7 and S8.

The above switches S1 and S3 and the switches S2 and S4 are constructed so that the pairs of switches perform reverse operations. Similarly, the switches S5 and S7 and the switches S6 and S8 are constructed so that the pairs of switches perform reverse operations. The switches S1 through S8 are of the above described constructions so as to prevent unstable switching operation due to voltage drop when transistors and the like are used for the switches S1 through S8. The switches S1 through S8 can be realized by selectively using NPN-type and PNP-type transistors. Further, switches having no contacts by using semiconductors, field-effect-transistors (FETs), and the like can be used for the above switches S1 through S8.

In the present embodiment of the invention, the switches S1, S3, S5, and S7 become OFF (open) when the levels of respective switching signals applied thereto are low, and become ON (closed) when the levels of the respective switching signals applied thereto are high. On the other hand, the switches S2, S4, S6, and S8 become ON (closed) when the levels of respective switching signals applied thereto are low, and become OFF (open) when the levels of the respective switching signals applied thereto are high.

A first logic circuit 19 indicated by a broken line in FIG. 1 is constructed from NAND-gates 30 and 31 and NOR-gates 32, 33, and 34, and comprises three digital signal input terminals E1, F1, and G1, and four digital signal output terminals A1, B1, C1, and D1. The input terminal E1 is connected to one input terminal of the NOR-gate 32 and to one input terminal of the NOR-gate 34, and the other input terminal of the NOR-gate 34 is connected to one input terminal of the NOR-gate 33. An output terminal of the NOR-gate 34 is connected to the other input terminal of the NOR-gate 32 and to the other input terminal of the NOR-gate 33. The input terminal F1 is connected to one input terminal of the NAND-gate 30 and to one input terminal of the NAND-gate 31. The other input terminal of the NAND-gate 30 is connected to an output terminal of the NOR-gate 32 and to the input terminal A1. The other input terminal of the NAND-gate 31 is connected to an output terminal of the NOR-gate 33 and to the output terminal D1. Output terminals of the NAND-gates 30 and 31 are respectively connected to the output terminals B1 and C1. The above output terminals A1, B1, C1, and D1 are respectively connected to switching signal input terminals of the switches S3, S2, S4, and S1.

A second logic circuit 20 is constructed from NAND-gates 35 and 36 and NOR-gates 37, 38, and 39, and comprises three digital signal input terminals E2, F2, and G2, and four digital signal output terminals A2, B2, C2, and D2, as indicated by a broken line in FIG. 1. This second logic circuit 20 is of a construction similar to that of the first logic circuit 19. The NAND-gates 35 and 36, NOR-gates 37, 38, and 39, the input terminals E2, F2, and G2, and the output terminals A2, B2, C2, and D2 respectively correspond to the NAND-gates 30 and 31, NOR-gates 32, 33, and 34, input terminals E1, F1, and G1, and the outputs terminals A1, B1, C1, and D1, of the first logic circuit 19. Accordingly, the output terminals A2, B2, C2, and D2 of the second logic circuit 20 are respectively connected to switching signal input terminals of the switches S7, S6, S8, and S5. Detailed description with respect to the connections of the second logic circuit 20 will be omitted, since the construction is similar to that of the first logic circuit 19 as described above.

The truth tables for the above first and second logic circuits 19 and 20 and the relationship between the ON or OFF states of the switches S1 through S4, and switches S5 through S8, are respectively shown in following Tables 1 and 2. In Tables 1 and 2, "H" and "L" respectively indicate high and low levels of signals, "CL" indicates that the switch is in an ON (closed) state, and spaces left blank indicate that the switch is in an OFF (open) state.

TABLE 1

|  | E1 | F1 | G1 | A1 | B1 | C1 | D1 | S1 | S2 | S3 | S4 |
|---|---|---|---|---|---|---|---|---|---|---|---|
| (i) | H | L | H | L | H | H | L |  |  |  |  |
| (ii) | H | L | H | L | H | H | L |  |  |  |  |
| (iii) | H | L | H | L | H | H | L |  |  |  |  |
| (iv) | H | L | H | L | H | H | L |  |  |  |  |
| (v) | H | L | H | L | H | H | L |  |  |  |  |
| (vi) | H | L | H | L | H | H | L |  |  |  |  |
| (vii) | L | H | H | H | L | H | L |  |  | CL | CL |
| (viii) | L | H | H | H | L | H | L |  |  | CL | CL |

TABLE 2

|  | E2 | F2 | G2 | A2 | B2 | C2 | D2 | S5 | S6 | S7 | S8 |
|---|---|---|---|---|---|---|---|---|---|---|---|
| (i) | H | L | L | L | H | H | H | CL |  |  |  |
| (ii) | H | H | L | L | H | L | H | CL |  |  | CL |
| (iii) | H | L | L | L | H | H | H | CL |  |  |  |
| (iv) | H | H | L | L | H | L | H | CL |  |  | CL |
| (v) | H | L | H | L | H | H | L |  |  |  |  |
| (vi) | H | L | H | L | H | H | L |  |  |  |  |
| (vii) | H | L | H | L | H | H | L |  |  |  |  |
| (viii) | H | L | H | L | H | H | L |  |  |  |  |

In FIG. 1, a third logic circuit 21 indicated by a broken line is constructed from a NAND-gate 41, an AND-gate 42, and inverters 40 and 43. The third logic circuit 21 further comprises a digital mode signal input terminal K1 to which a signal respective of the rotation or stopping mode of the tape reels is applied, an input terminal K2 to which a train of pulses whose duty cycle can be varied is applied, and an input terminal H2 to which the output digital signal of the comparator of the second bridge circuit 17 is applied. Moreover, the third logic circuit 21 has digital signal output terminals P, Q, S, and T.

The input terminal K1 is connected to one input terminal of the NAND-gate 41 and to the input terminal G2 of the second logic circuit 20 through the output terminal T. This output terminal T is connected to one input terminal of the AND-gate 42 through the inverter 43. The input terminal K2 is connected to the other input terminal of the AND-gate 42, and an output of this AND-gate 42 is supplied to the input terminal F2 of the second logic circuit 20 through the output terminal S. The output digital signal of the comparator 23 is supplied to the other input terminal of the NAND-gate 41 through the input terminal H2. Moreover, an output of the NAND-gate 41 is supplied to the output terminal P and to the inverter 40. The output terminal P is connected to the input terminal E1 of the first logic circuit 19, and an output of the inverter 40 is supplied to the input terminal F1 of the first logic circuit 19 through the output terminal Q.

Therefore, the relationship between the levels of signals at the input terminals E1, F1, G1, E2, F2, and G2 of the first and second logic circuits and the levels of signals at the input terminals K1, K2, and H2 of the third logic circuit 21 becomes as indicated in the truth table shown in Table 3. In Table 3, "H", and "L" respectively indicate high and low levels of signals. In Addition, as seen from Table 3, a digital signals having constant levels are respectively applied to the input terminal G1 of the first logic circuit 19 and to the input terminal E2 of the second logic circuit 20 (in the present embodiment of the invention, high-level signals are respectively applied to these input terminals G1 and E2).

TABLE 3

|       | K1 | H2 | K2 | E1 | F1 | G1 | E2 | F2 | G2 |
|-------|----|----|----|----|----|----|----|----|----|
| (i)   | L  | L  | L  | H  | L  | H  | H  | L  | L  |
| (ii)  | L  | L  | H  | H  | L  | H  | H  | H  | L  |
| (iii) | L  | H  | L  | H  | L  | H  | H  | L  | L  |
| (iv)  | L  | H  | H  | H  | L  | H  | H  | L  | L  |
| (v)   | H  | L  | L  | H  | L  | H  | H  | L  | H  |
| (vi)  | H  | L  | H  | H  | L  | H  | H  | L  | H  |
| (vii) | H  | H  | L  | L  | H  | H  | H  | L  | H  |
| (viii)| H  | H  | H  | L  | H  | H  | H  | L  | H  |

Moreover, states (i) through (viii) in Table 1, states (i) through (viii) in Table 2, and states (i) through (viii) in Table 3 respectively correspond to each other.

Next, description will be given with respect to the operation of the embodiment shown in FIG. 1. In a case where the apparatus is in a fast-forward mode in which the tape 13 moves in the direction of the arrow X at a high speed, and the tape 13 is taken up by the take-up side tape reel 12, the motor 14 is in a released state, and a positive voltage is applied to the motor 15. Here, the voltage referred to as the positive voltage is a voltage which rotates the motor in a direction so as to move the tape 13 towards the direction of the arrow X. Accordingly, the motor 15 rotates towards a positive direction. In this state, a digital signal of low level is applied to the input terminal K1 of the third logic circuit 21. Furthermore, although the positive voltage is applied to the motor 15, the comparator 23 of the second bridge circuit 17 is constructed to produce a high-level signal in this state, and the signal level at the input terminal H2 of the third logic circuit 21 accordingly becomes high. Moreover, a train of pulses such as the pulses shown in FIG. 2(A) having two values whose duty cycle can be varied, is applied to the input terminal K2 of the third logic circuit 21.

Hence, due to the signal levels at the output terminals P, Q, S, and T of the third logic circuit 21, the signal levels of the input terminals E1 and F1 of the first logic circuits 19 and at the input terminals E2 and F2 of the second logic circuit 20 become as shown in states (iii) and (iv) of the Table 3. That is, the input signal levels at the input terminals E1, F1, and G1 of the first logic circuit 19 respectively becomes "H", "L", and "H", and the input signal levels at the input terminals E2, F2, and G2 of the second logic circuit 20 respectively become "H", "L", and "L" or "H", "H", and "L" (high-level signals are constantly applied to the input terminals G1 and E2 as described above). Thus, the output signal levels at the output terminals A1, B1, C1, and D1 of the first logic circuit 19 respectively become "L", "H", "H", and "L", and corresponds to state (iii) or (iv) indicated in Table 1. Accordingly, all the switches S1 through S4 of the first bridge circuit 16 becomes OFF (open), and the motor 14 is put into a released state.

On the other hand, the output signal levels at the output terminals A2, B2, C2, and D2 of the second logic circuit 20 respectively become "L", "H", "H", and "H" or "L", "H", "L", and "H", and corresponds to the states (iii) or (iv) in Table 2. In the state (iv) shown in Table 2, the switches S5 and S8 are respectively put into ON (closed) states, and the motor terminals of the motor 15 are respectively connected to the power source 18 through the switches S5 and S8. Accordingly, the motor 15 is rotated in the positive direction. Hence, the take-up side tape reel 12 also rotates according to the rotation of the motor 15, and moves the tape 13 towards the direction of the arrow X in FIG. 1. On the other hand, in the state (iii) shown in Table 2, only the switch S5 is put into an ON (closed) state, and only one motor terminal of the motor 15 is connected to the power source 18. In this state, the motor 15 and the take-up side tape reel 12 are not rotated, since the other motor terminal of the motor 15 is not connected to the power source 18.

When the repetition frequency of the train of pulses applied to the input terminal K2 is selected at a relatively high frequency in the range of few hundred Hz to few kHz, a driving voltage is intermittently applied to the motor 15 from the power source 18. In a case where the period in which the driving voltage is interrupted in short, the motor 15 continues to rotate in the positive direction due to inertia, and thus, the motor 15 accordingly continues to rotate in a normal manner. Moreover, by varying the duty cycle of the train of pulses applied to the input terminal K2, the average power supplied to the motor 15 can be varied. Hence, the rotational speed or the rotational torque of the take-up side tape reel 12 can be varied arbitrarily.

Figure 2B:
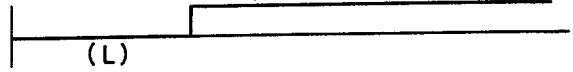

Next, the operation of the above apparatus will be described for the case where the operational mode is changed from a fast-forward mode to a stop mode. In a case where the recording and/or reproducing apparatus is in a fast-foward mode from time t1, and the operational mode is changed into a stop mode at a time t2, the level of the signal supplied to the input terminal K1 of the third logic circuit 21 is changed from low level to high level at the time t2 as shown in FIG. 2(B). The signal may be produced conventionally by a flip-flop circuit operated by a manually controlled switch (not shown). The levels of the signals supplied to the other input terminals K2 and H2 are the same as those upon fast-forward mode. Accordingly, the output signal levels at the output terminals of the third logic circuit 21 respectively become as shown by the state (vii) or (viii) in Table 3. The output signal levels at the switches S1 through S4 of the first logic circuit 19 respectively become as indicated by the state (vii) or (viii) in Table 1. Further, the output signal levels at the switches S5 through S8 of the second logic circuit 20 respectively become as indicated by the state (vii) or (viii) in Table 2.

Therefore, as is clear from the states (vii) and (viii) shown in the Table 1, the switches S2 and S3 respectively are always in ON (closed) states regardless of the repetition frequency of the train of pulses applied to the input terminal K2. Thus, the motor terminals of the motor 14 are respectively connected to the power source 18, and the motor 14 and the supply side tape reel 11 are respectively rotated in a direction so as to move the tape 13 towards the direction of the arrow X in FIG. 1. That is, the motor 14 in in a released state before the time t2 as shown in FIG. 2(D), however, after the time t2, the motor 14 is supplied with the reverse voltage until a time t3.

On the other hand, as is clear from the states (vii) and (viii) in the Table 2, all the switches S5 through S8 are always in released states regardless of the repetition frequency of the train of pulses applied to the input terminal K2. That is, the motor 15 is applied with the positive voltage before the time t2 as shown in FIG. 2(E), however, the motor 15 is put into a released state after the time t2. Accordingly, the motor 15 continues to rotate in the positive direction after the time t2 due to inertia, to generate a counter electromotive voltage. As the reverse voltage is applied to the motor 14, the rotational speed of the motor 15 decreases as shown by dotted lines in FIG. 2(E), and the rotation of the motor 15 is stopped completely at the time t3.

During the period in which the motor 15 and the take-up side tape reel 12 rotate due to inertia (an interval between times t2 and t3), the terminals of the motor 15 are disconnected from the power source 18. However, in this state, a reverse voltage is generated from the motor 15. Hence, the output signal level of the comparator 23 is of high level as in the state before the time t3. When the rotation of the motor 15 and the take-up side tape reel 12 stops completely, however, the above reverse voltage generated by the motor 15 becomes zero, and the output signal level of the comparator 23 accordingly becomes of low level. Therefore, as indicated by a one-dot chain line $I_{H2}$ in FIG. 2(E), the signal level at the input terminal H2 changes from high level to low level between the times t2 and t3. Thus, the input signal levels at the input terminals K1, K2, and H2 of the third logic circuit 21 respectively become as indicated by the state (v) or (vi) in the Table 3. Accordingly, the output signal levels and the ON or OFF states of the switches S1 through S4 in the first logic circuit 19 respectively become as indicated by the state (v) or (vi) in the Table 1, and all the switches S1 through S4 are put into released states. Hence, as shown in FIG. 2(D), the motor 14 becomes disconnected from the power source 18 after the time t3, and the application of the reverse voltage is interrupted.

On the other hand, the output signal levels and the ON or OFF states of the switches S5 through S8 of the second logic circuit 20 respectively become as indicated by the state (v) or (vi), and the state of the switches S5 through S8 remain in the same states as those upon the states (vii) and (viii) indicated in Table 2. Thus, the motor 15 remains to be in the released state, and the movement of the tape 13 is completely stopped.

Figure 2C:
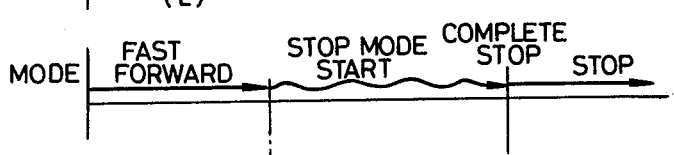
Figure 2D:
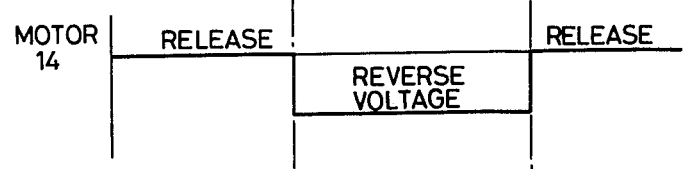
Figure 2E:
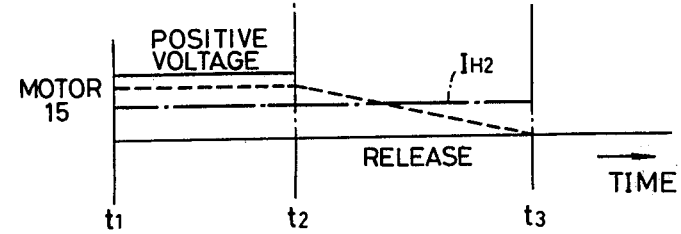

The recording and/or reproducing apparatus is in a fast-forward mode as shown in FIG. 2(C) until the time t2, since the positive voltage is applied to the motor 15 until the time t2. When the stop mode begins at the time t2, the reverse voltage is applied to the motor 14 due to the generation of the counter electromotive voltage by the motor 15, to perform braking operation on the tape 13 which is moving towards the direction of the arrow X in FIG. 1. Further, when the rotation of the motor 15 and the take-up tape reel is stopped at the time t3, after the short time period between times t2 and t3 in which the motor 15 rotates due to inertia as the motor 15 is put into a released state at the time t2, the reverse voltage generated by the motor 15 becomes zero. Accordingly, the comparator 23 detects that the rotation of the motor 15 has stopped. As a result, both the motors 14 and 15 are put into released states, and the rotation of the tape reels 11 and 12 both stop completely at the time t3 and thereafter, as shown in FIG. 2(C). In this case, since the braking operation is performed by applying the reverse voltage only to the motor 14, no slack is introduced in the tape 13 as the movement of the tape 13 is stopped. Hence, the tape 13 can be stopped positively and smoothly.

In the present embodiment of the invention, the first, second, and third logic circuits 19, 20, and 21 are respectively constructed from hardware. However, since these logic circuits perform digital signal processing, the logic circuits can be realized by use of a micro-computer. The micro-computer can thus perform similar operations as those performed by the above logic circuits, by pre-establishing a program to perform predetermined operations.

In addition, in the present embodiment of the invention, description was only given for a case where the tape 13 is moved towards one direction. However, by using a changeover switch and the like, for example, the tape 13 can be moved towards a reverse direction. In this case, the switchover operation to rotate the motors 14 and 15 in the reverse directions can be performed by interchanging the input terminals E1 and G1 of the first logic circuit 19, interchanging the input terminals E2 and G2 of the second logic circuit 20, and detecting the stoppage of rotation of the motor 14 by the comparator 22.

Further, this invention is not limited to these embodiments but various variations and modifications may be made without departing from the scope of the invention.

What is claimed is:

1. An apparatus for stopping rotation of tape reels, said apparatus having a first motor for rotationally driving a first tape reel, a second motor for rotationally driving a second tape reel, and a control circuit means for controlling the rotation of the motors by independently controlling the rotation of the first and second motors, and for stopping the first and second tape reels after a recording medium in a tape form has been fed from the first tape reel and taken up by the second tape reel, said control circuit means comprising:

first bridge circuit means having four switches which respectively form four sides of said first bridge circuit, the contiguous sides of said bridge joining each other at four apexes, said first motor having motor terminals respectively connected between one pair of opposing apexes of the first bridge circuit;

second bridge circuit means having four switches which respectively form four sides of said second bridge circuit, the contiguous sides of said bridge joining each other at four apexes, said second motor having its motor terminals respectively connected between one pair of opposing apexes of the second bridge circuit;

first terminal means having at least three terminals for receiving input digital signals;

first logic circuit means having outputs connected to said first bridge circuit means and being responsive to said input digital signals from the first terminal means for producing digital signals from four output terminals in response to said input digital signals supplied to said three input terminals of said first terminal means, to independently switch ON or OFF each of the four switches of said first bridge circuit;

second terminal means having at least three terminals for receiving input digital signals;

second logic circuit means having outputs connected to said second bridge circuit means and being responsive to said input digital signals from the second terminal means for producing digital signals from four output terminals in response to said input digital signals supplied to said three input terminals of said second terminal means, to independently switch ON or OFF each of the four switches of said second bridge circuit;

comparator means having a digital output signal and being coupled to terminals of said second motor for comparing the voltage difference therebetween; and third logic circuit means responsive to said output digital signal of said comparator which compares the voltage difference between motor terminals of said second motor, a train of pulses for controlling the rotational speed or the rotational torque of said second motor, and a digital signal indicating a rotation mode or a stop mode, respectively, said third logic circuit means producing and supplying output digital signals to said first and second logic circuit means in response to the digital signal indicating the rotation mode supplied thereto, to control said first and second logic circuit means so that the motor terminals of said first motor are released, and so that a train of pulses is applied to the motor terminals of said second motor so that said second tape reel takes up said recording medium of a tape form, said third logic circuit means producing and supplying output digital signals to said first and second logic circuit means in response to the digital signal indicating the stop mode supplied thereto, to control said first and second logic circuit means so that a voltage is applied to the motor terminals of said first motor to obstruct said second tape reel from taking up said recording medium of a tape form, and so that after the motor terminals of said second motor are released, the motor terminals of said first and second motors are respectively disconnected to release said first and second motors when said comparator detects that a counter electromotive voltage generated by said second motor is zero.

2. An apparatus for stopping rotation of tape reels as claimed in claim 1 in which the duty cycle of said train of pulses which is applied to said third logic circuit, for controlling the rotational speed or the rotational torque of said second motor, is varied to perform the control of the rotational speed or the rotational torque of said second motor.

3. An apparatus for stopping rotation of tape reels as claimed in claim 1 in which a pair of switches of said first and second bridge circuit means, which are connected commonly to one of the terminals of a power source, perform a close and open operation in a reverse relationship to the operation of another pair of switches in the same bridge circuit, which are connected commonly to the other terminal of the power source, in response to a high or a low level of input digital signal to the bridge circuit.

* * * * *